(12) United States Patent
Ritzberger et al.

(10) Patent No.: US 12,715,717 B2
(45) Date of Patent: Aug. 25, 2026

(54) TRANSPORT SYSTEM AND USE OF A PLASTIC TRAY FOR A TRANSPORT SYSTEM

(71) Applicant: GEORG UTZ HOLDING AG, Bremgarten (CH)

(72) Inventors: Axel Ritzberger, Altendorf (CH); Rüdiger Sostmann, Lingen (DE)

(73) Assignee: GEORG UTZ HOLDING AG, Bremgarten (CH)

( * ) Notice: Subject to any disclaimer, the term of this patent is extended or adjusted under 35 U.S.C. 154(b) by 86 days.

(21) Appl. No.: 18/869,495

(22) PCT Filed: May 11, 2023

(86) PCT No.: PCT/CH2023/050013
§ 371 (c)(1),
(2) Date: Nov. 26, 2024

(87) PCT Pub. No.: WO2023/230734
PCT Pub. Date: Dec. 7, 2023

(65) Prior Publication Data

US 2025/0353694 A1 Nov. 20, 2025

(30) Foreign Application Priority Data

May 31, 2022 (CH) ................................ 000656/2022

(51) Int. Cl.
*B65G 65/02* (2006.01)

(52) U.S. Cl.
CPC ...... *B65G 65/02* (2013.01); *B65G 2201/0258* (2013.01); *B65G 2207/46* (2013.01)

(58) Field of Classification Search
CPC ............ B65G 65/02; B65G 2201/0258; B65G 2207/46
USPC .......................................................... 198/506
See application file for complete search history.

(56) References Cited

U.S. PATENT DOCUMENTS

2004/0193311 A1 9/2004 Winkler

FOREIGN PATENT DOCUMENTS

| | | | |
|---|---|---|---|
| CN | 104609049 B | | 3/2018 |
| CN | 111902832 A | | 11/2020 |
| CN | 223733666 | * | 12/2025 |
| DE | 102009008155 A1 | | 8/2010 |
| EP | 1698573 A1 | | 9/2006 |
| EP | 3770075 A1 | | 1/2021 |
| GB | 2552294 A | | 1/2018 |
| TW | 202501605 | * | 1/2025 |

OTHER PUBLICATIONS

International Search Report and Written Opinion received for PCT/CH2023/050013, mailed Jul. 5, 2023.

* cited by examiner

*Primary Examiner* — Gene O Crawford
*Assistant Examiner* — Lester Rushin, III
(74) *Attorney, Agent, or Firm* — Greer, Burns & Crain, Ltd

(57) ABSTRACT

A transport system for conveying a plastic tray for transporting and unloading goods is described, wherein the plastic tray has a bottom, a frame and openings with a cruciform cross-section in the bottom for the reach-through of lifting pins of the transport system, and wherein the transport system has a conveyor belt and an unloading station with lifting pins. The lifting pins have a cruciform cross-section, which is complementary to the cruciform openings of the plastic tray.

11 Claims, 7 Drawing Sheets

TRANSPORT SYSTEM AND USE OF A PLASTIC TRAY FOR A TRANSPORT SYSTEM

PRIORITY CLAIM

This application is a 35 U.S.C. § 371 U.S. National Stage application of PCT/CH2023/050013, filed May 11, 2023, which claims the benefit of priority to CH Application Serial No. CH000656/2022, filed May 31, 2022, all of which are incorporated by reference in their entirety herein.

BACKGROUND

The invention relates to a transport system and the use of a plastic tray for a transport system for transporting goods.

Transport systems and trays with a circumferential edge for transporting goods via a transport system, such as a conveyor belt, are well known and are described, for example, in EP 1698573 A1. Such transport systems use trays that have round holes in the bottom for the passage and lifting of the goods by lifting pins.

The disadvantage of such trays with holes is that, depending on the position of the goods on the tray, the round lifting pins of the tray systems do not hit the goods properly and the goods can tip over or be lifted insufficiently from the tray. In addition, round lifting pins can damage the goods and make small holes in filigree items.

SUMMARY

The present invention is based on the problem of specifying a transport system and the use of a plastic tray for such a transport system, wherein the transport system and the use of the plastic tray allows a larger support of the goods on lifting pins, so that the goods are not damaged when lifted by lifting pins, and in which at the same time the stability of the tray surface is maintained.

DETAILED DESCRIPTION

This problem is solved by a transport system and the use of a plastic tray for a transport system for transporting and unloading goods, wherein the plastic tray has a bottom, frame and openings with a cruciform cross-section in the bottom for the reach-through of lifting pins of the transport system, and wherein the transport system has a conveyor belt and an unloading station with lifting pins, the lifting pins having a cruciform cross-section which is designed to complement the cruciform openings of the plastic tray. The openings with a cruciform cross-section are hereinafter referred to as cruciform openings.

The advantage of openings with a cruciform cross-section over round openings is that, with the same diameter of the opening, the circumference of cruciform openings is greater than the circumference of round openings. As a result, the ejection in the tray is smaller for cruciform openings with the same diameter, and thus the stability of the tray surface of the bottom is greater than with correspondingly large round openings. Cruciform lifting pins, which can grip through the cruciform openings, offer optimal support of the goods with the least possible loss of the bottom area of the trays. This means that even small goods can be lifted from the tray without being damaged. With round lifting pins, there is a risk of holes in the goods. In addition, the guidance of the goods is better with cruciform lifting pins than with round lifting pins, and there is less risk of the goods tipping to the side.

Preferably, the cruciform openings are arranged in parallel rows, with the cruciform openings of one row preferably offset from the cruciform openings of an adjacent row. This allows the cruciform openings to be arranged as widely distributed as possible while maintaining the stability of the bottom. Preferably, the cruciform openings are arranged at equal distances over the entire bottom surface of the plastic tray. This offers the special advantage that the goods to be transported can be positioned anywhere on the bottom of the plastic tray, and the goods are always hit and lifted by the lifting pins when lifting the plastic tray. Preferably, the cruciform openings of a row are arranged offset relative to the cruciform openings of an adjacent row by less than one cross length and at least by the width of a cross arm.

The distance between the cruciform openings in a row and to the adjacent row is therefore preferably smaller than the length of a cross arm. Preferably, the distance between the cruciform openings is greater than the width of a cross arm. In a preferred embodiment, the rows in the transverse direction have two or three cruciform openings per row and five longitudinal rows offset from each other. Preferably, the longitudinal rows have four or five cruciform openings per longitudinal row and nine transverse rows offset from each other.

In a preferred embodiment, the cross arms of the cruciform openings have a 90-degree angle with respect to each other. Preferably, the cross arms of the cruciform openings are arranged in the longitudinal and transverse directions of the tray. Preferably, the cross arms each have the shape of a rectangular beam, are of equal length and are arranged at right angles to each other. The cruciform openings have only two cross arms each and preferably have the shape of a plus sign +.

In another embodiment, the cross arms of the cruciform openings are rotated 45 degrees with respect to the longitudinal direction of the plastic tray, and the openings have an x-shape.

Preferably, the two cross arms of the cruciform openings are the same length, preferably between 50 and 150 mm long, and even more preferably 100 mm long.

The bottom of the plastic tray is flat and tray-shaped and preferably surrounded by a frame. Depending on the application, the bottom can be of different thicknesses and can have reinforcing ribs on the underside of the bottom, for example between the cruciform openings, to further stabilize the bottom. In one embodiment, the frame surrounds the upper part of the bottom, with the lower part of the bottom protruding from the bottom of the frame. The frame of the plastic tray preferably has a flat top and bottom and is preferably arranged over the entire circumference of the plastic tray. In a preferred embodiment, the frame has the same height over the entire circumference of the plastic tray.

Preferably, the plastic trays can be stacked on top of each other, preferably in such a way that the underside of the frame of the upper plastic tray rests on the top of the frame of the lower plastic tray when stacked. In one embodiment, the bottom of the upper tray is stacked within the frame of the lower tray so that it fits flush with the lower container and the container cannot be moved with respect to the lower container.

The plastic trays are made of a durable and resilient material, preferably of one or more thermoplastics. For example, the thermoplastic material contains polyethylene or polypropylene or mixtures thereof.

The transport system according to the invention is suitable for conveying a plastic tray with cruciform openings for transporting and easy unloading of goods, whereby the transport system has an unloading station with lifting pins, which have a cruciform cross-section, which is formed complementary to the cruciform openings. The lifting pins have a cruciform cross-section, which is preferably slightly smaller than the cruciform cross-section of the cruciform openings, so that the lifting pins do not jam when reaching through the cruciform openings. Such transport systems are used, for example, to transport goods, such as food, drug-store items and spare parts of all kinds in cardboard boxes. For this purpose, the goods are loaded from a warehouse, preferably individually or in several pieces, onto a plastic tray and transported via a conveyor belt to an unloading station, where the goods are lifted from the plastic tray by means of lifting pins and pushed onto a conveyor belt above with the help of a conveyor arm. This separates the goods and the plastic tray from each other, and the plastic tray is transported away via a lower conveyor belt.

For transportation, the goods are loaded onto a plastic tray. The plastic tray with cruciform openings is transported with the loaded goods via a conveyor belt to the unloading station, where it is centered with the help of inlet slopes, which are positioned laterally of the unloading station, and stopped by stoppers in the form of latches. The latches are arranged at the end of the inlet slopes of the unloading station to hold the plastic tray in position, so that the cruciform openings of the plastic tray are placed exactly above the cruciform openings of the unloading station for the insertion of lifting pins. In this position, lifting pins push through the openings of the unloading station and the openings of the plastic tray, which lifts the goods and transports them to the next conveyor belt, which leads slightly upwards, with the help of a conveyor arm. The conveyor arm, for example, is moved by an electronically operated gripper arm. As a result, the plastic tray is empty and the lifting pins are retracted. The goods are transported away via the other conveyor belts, the latches are lowered so that the plastic tray can be transported to the back onto a lower conveyor belt by another conveyor arm. The goods and the plastic tray are then transported separately on different levels and the latches are folded up again to stop and position the next plastic tray.

In addition, the present invention discloses a use of a plastic tray for a transport system for transporting goods, wherein the plastic tray has a bottom, a frame and openings in the bottom for reaching through lifting pins of the transport system for unloading the goods from the plastic tray, wherein the openings of the plastic tray have a cruciform cross-section, and the lifting pins have a cruciform cross-section, which is complementary to the openings with a cruciform cross-section.

Combinations of two or more of the above versions and variants are conceivable and claimed.

Further advantages of the invention will become apparent from the following description, in which the invention is explained in more detail on the basis of embodiments shown in the drawings.

BRIEF DESCRIPTION OF THE DRAWINGS

It shows.

The same reference signs are used for the same elements in the figures and explanations for a particular reference sign apply to all figures, unless otherwise expressly stated.

EXAMPLES OF THE INVENTION

Figure 1:
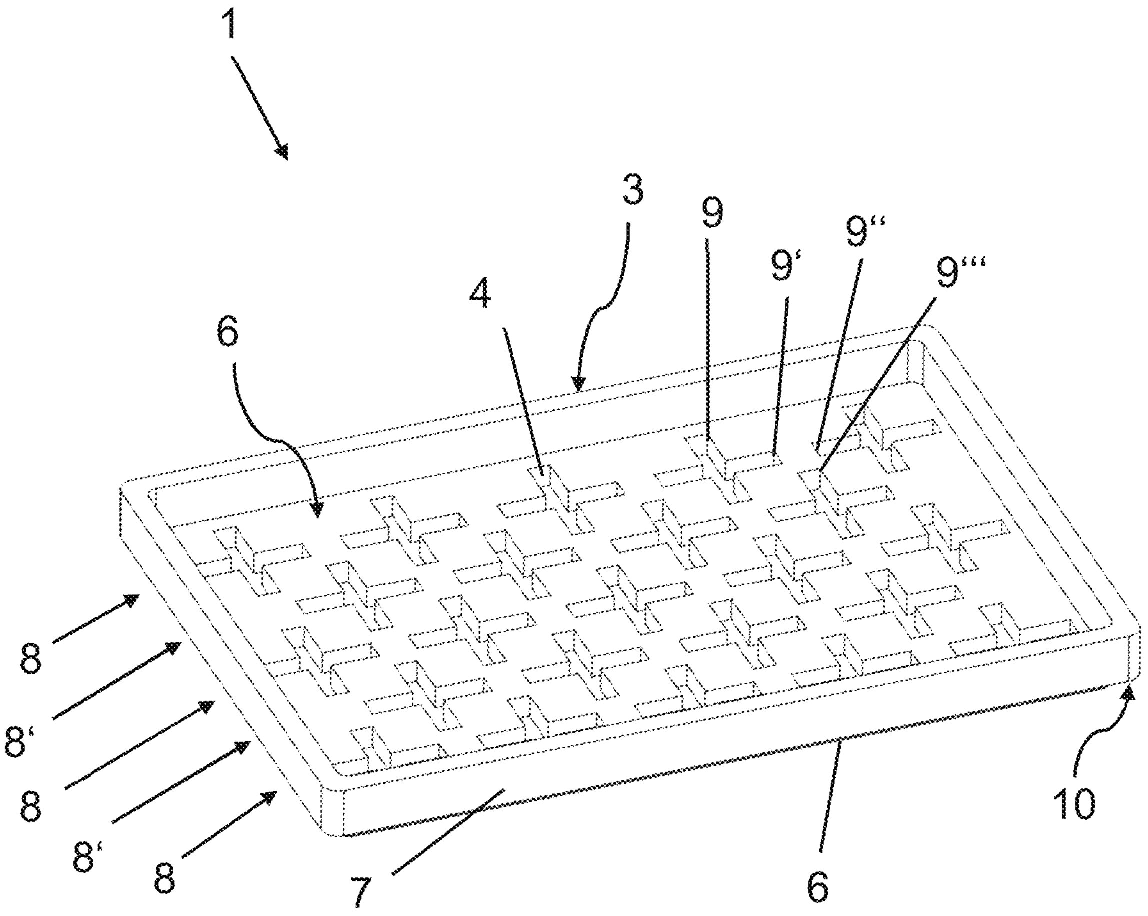
FIG. 1 a plastic tray in perspective view from above.

FIG. 1 shows a perspective view from above of a plastic tray 1 for a transport system for transporting goods with a bottom 6, a frame 7 and with cruciform openings 4 in the bottom 6 for the passage of lifting pins 5 (not shown, shown in FIG. 5), with openings 4 having a cruciform cross-section with two cross arms 9, 9', forming the shape of a plus sign +. The cruciform openings 4 are arranged in parallel rows 8, 8' both longitudinally and transversely. The cruciform openings 4 of a row 8 are offset by less than a cross length and by more than the width of a cross arm compared to the cruciform openings 4 of an adjacent row 8'. The distance between two cruciform openings 4 in a row from the end of one cross arm 9' to the end of the neighboring cross arm 9" is thus between a quarter cross arm length and a whole cross arm length, preferably the distance is about one width of a cross arm. Likewise, the distance from the end of one cross arm 9' of a row 8 to the end of the cross arm 9" of an adjacent row is 8' between a quarter and a whole cross arm length, preferably one width of a cross arm. In the transverse direction, the rows have two or three cruciform openings 4 per row, so that the tray has five longitudinal rows offset from each other, two outer and one middle longitudinal row 8 and two longitudinal rows 8' in between. The cruciform openings 4 are arranged at equal intervals over the entire surface of bottom 6 of the plastic tray 1. Due to the staggered arrangement of the cruciform openings 4 in the bottom 6 of the plastic tray 1 distributed over the entire bottom 6, the bottom surface remains as stable as possible and the stability of the plastic tray 1 is maintained.

The cross arms 9, 9' of the cruciform openings 4 have a 90-degree angle to each other and the cross arms 9, 9' are of the same length. The cross arms 9, 9' of the cruciform openings 4 are arranged in this embodiment in the longitudinal and transverse direction of tray 1.

The frame 7 with a flat top side 3 and a bottom side 10 surrounds the entire perimeter of the plastic tray 1 as a circumferential rim and has the same height over the entire perimeter. Such plastic trays 1 can be stacked on top of each other in such a way that the bottom side 10 of the frame 7 of the upper plastic tray 1 rests on the top side 3 of the frame 7 of the lower plastic tray 1 when stacked (not shown).

Figure 2:
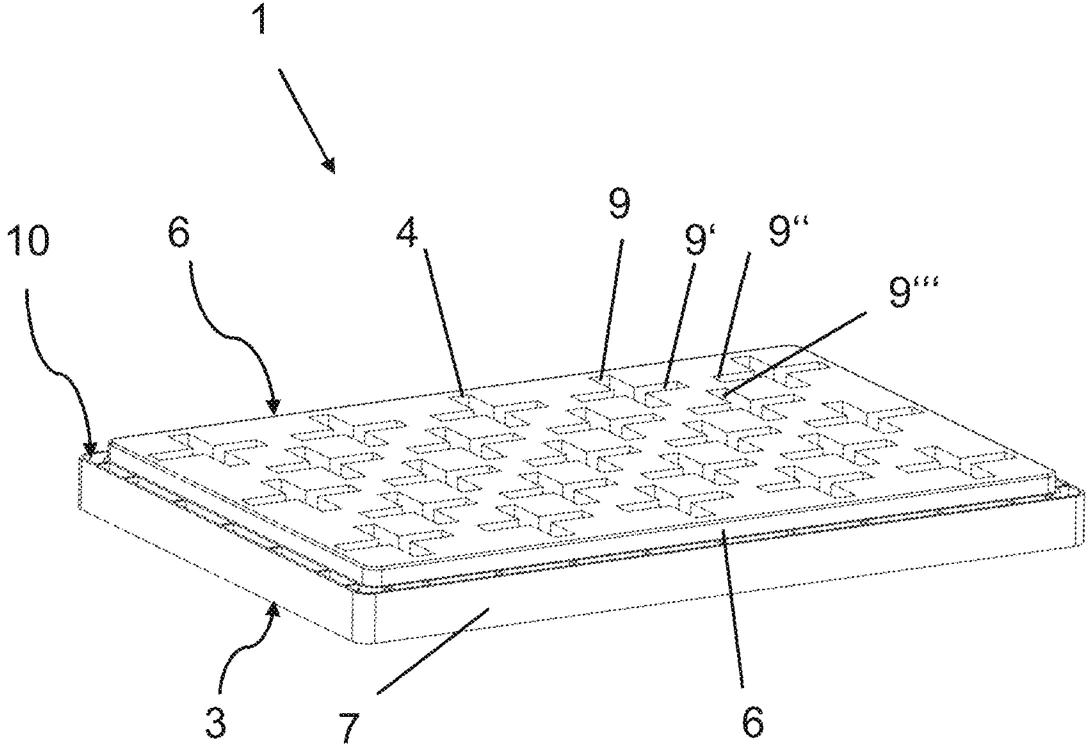
FIG. 2 a plastic tray in perspective view from below.

FIG. 2 shows a view from below on a plastic tray 1 as described in FIG. 1 with a bottom 6, a frame 7 and with cruciform openings 4 in the bottom 6 for reaching through lifting pins 5 (not shown), whereby openings 4 have a cruciform cross-section with cross arms 9, 9", 9'". The lower part of the bottom 6 protrudes from the bottom side 10 of frame 7.

Figure 3:
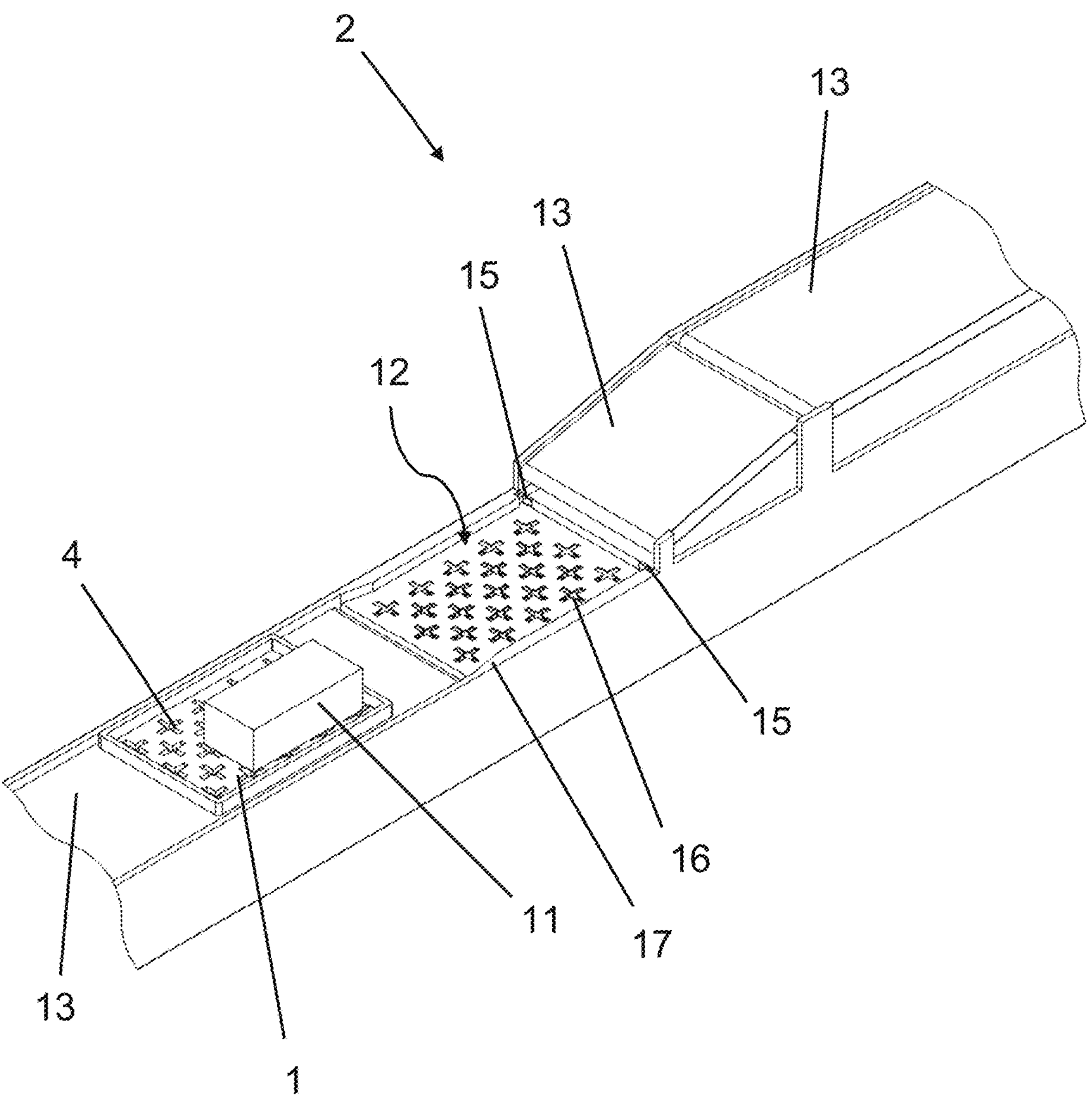
FIG. 3 a transport system with the goods on a plastic tray in the first position in perspective view, FIG. 4 a transport system with the goods on a plastic tray in the second position in perspective view, FIG. 5 a transport system with the goods on a plastic tray in the third position in perspective view, FIG. 6 a transport system with the goods on a plastic tray in the fourth position in perspective view, and FIG. 7 a transport system with the goods on a plastic tray in the fifth position in perspective view.

FIG. 3 shows a transport system 2 for conveying a plastic tray 1 for transporting goods with several sections of a conveyor belt 13 and an unloading station 12 with cruciform openings 16 for reaching through lifting pins 5 (not shown), wherein openings 16 for reaching through lifting pins have the same shape and are positioned in the same way as the cruciform openings 4 of the plastic tray 1. For transport, goods 11 are loaded onto a plastic tray 1. As shown in FIG. 2, the plastic tray 1 with cruciform openings 4 with loaded goods 11 is transported via a conveyor belt 13 to unloading station 12, where it is centered with the help of inlet slopes 17, which are positioned laterally at the unloading station 12, and stopped by stoppers in the form of latches 15. The latches 15 are arranged at the end of the inlet slopes 17 of the unloading station 12 in order to hold the plastic tray 1 in position, in such a way that the cruciform openings 4 of the plastic tray lie exactly above the cruciform openings 16 of the unloading station 12 as described in FIG. 4.

Figure 4:
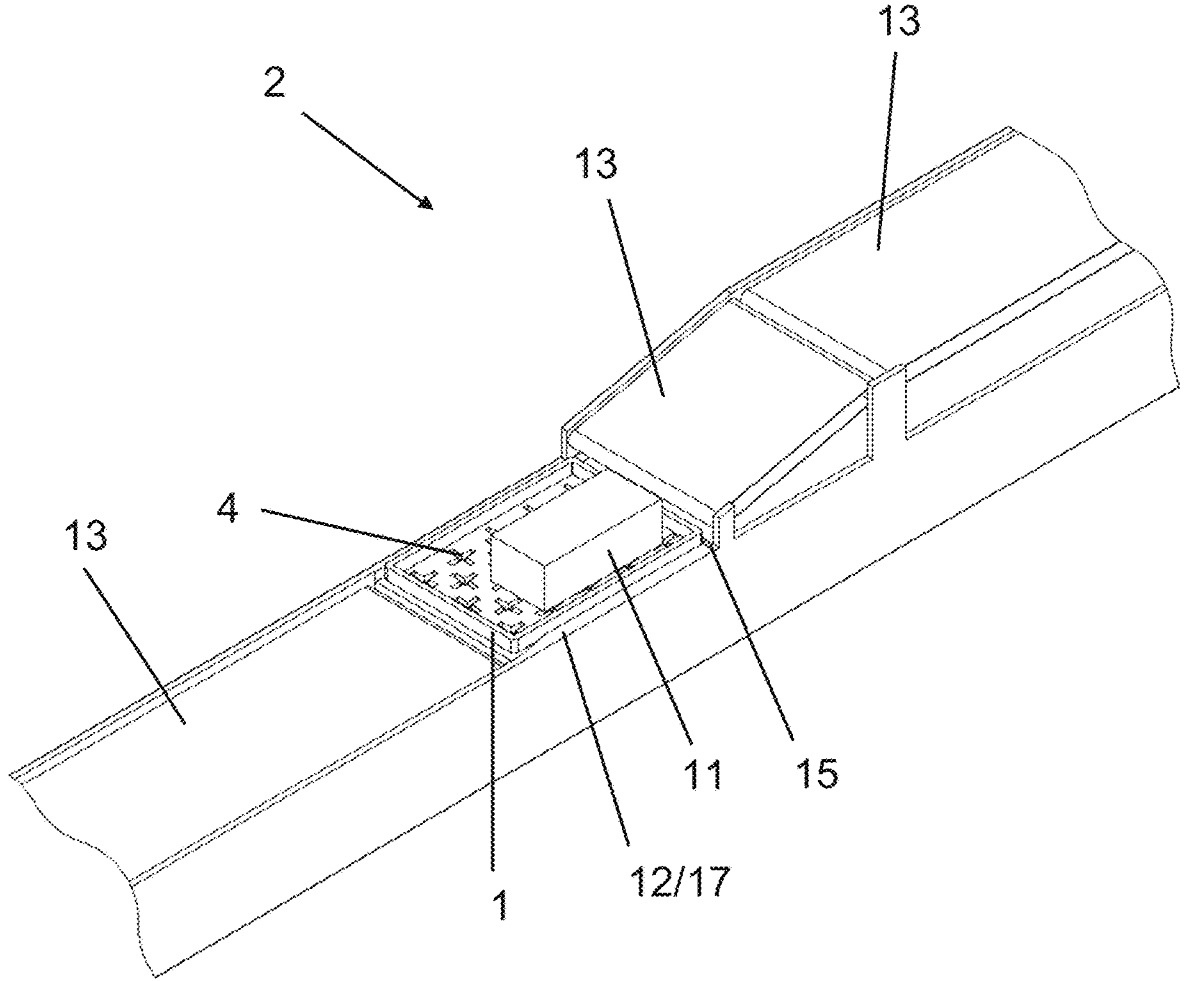

FIG. 4 shows a transport system 2 for conveying a plastic tray 1 for transporting goods as described in FIG. 3 with several sections of a conveyor belt 13 and an unloading station 12. In the position shown in FIG. 4, the plastic tray 1 is located on the unloading station 12 and is held in position by the inlet slopes 17 and the latches 15, so that the openings 4 of the plastic tray 1 are exactly above the openings 16 (not visible here) of the unloading station 12 for the passage of the lifting pins 5.

Figure 5:
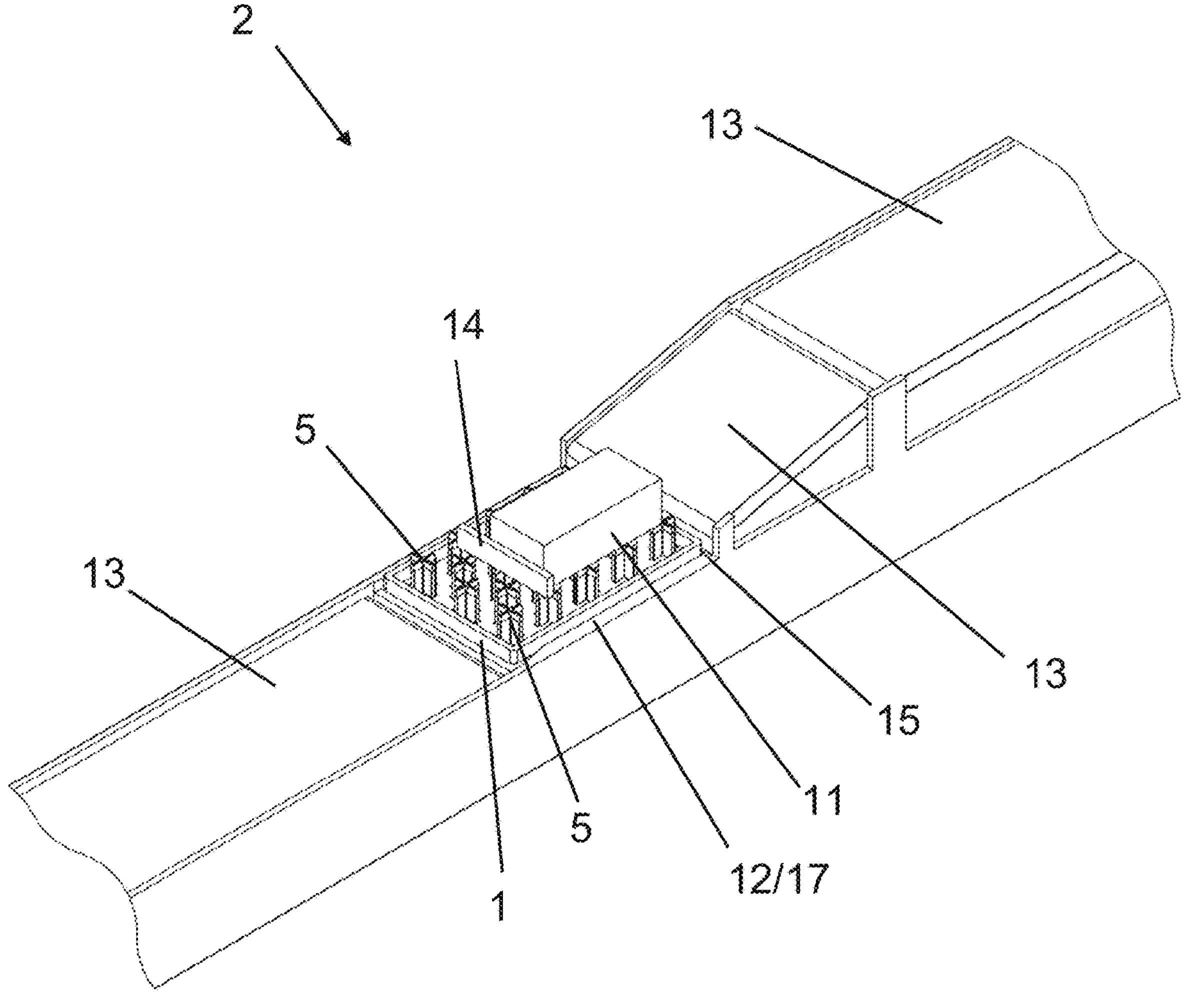

FIG. 5 shows a transport system 2 as described in FIG. 3 for conveying a plastic tray 1 for transporting goods with several sections of a conveyor belt 13 and an unloading station 12. In the position shown in FIG. 5, lifting pins 5 pass through openings 16 of the unloading station 12 and the openings 4 of the plastic tray 1, whereby goods 11 are lifted and transported to the next conveyor belt 13, which leads slightly upwards, with the help of a conveyor arm 14. The conveyor arm 14, for example, is moved by an electronically operated gripper arm (not shown). The lifting pins 5 have a cruciform cross-section, which is complementary to the cruciform openings 4 and is preferably slightly smaller than the cruciform cross-section of the cruciform openings 4, so that the lifting pins 5 do not jam when reaching through the cruciform openings 4.

Figure 6:
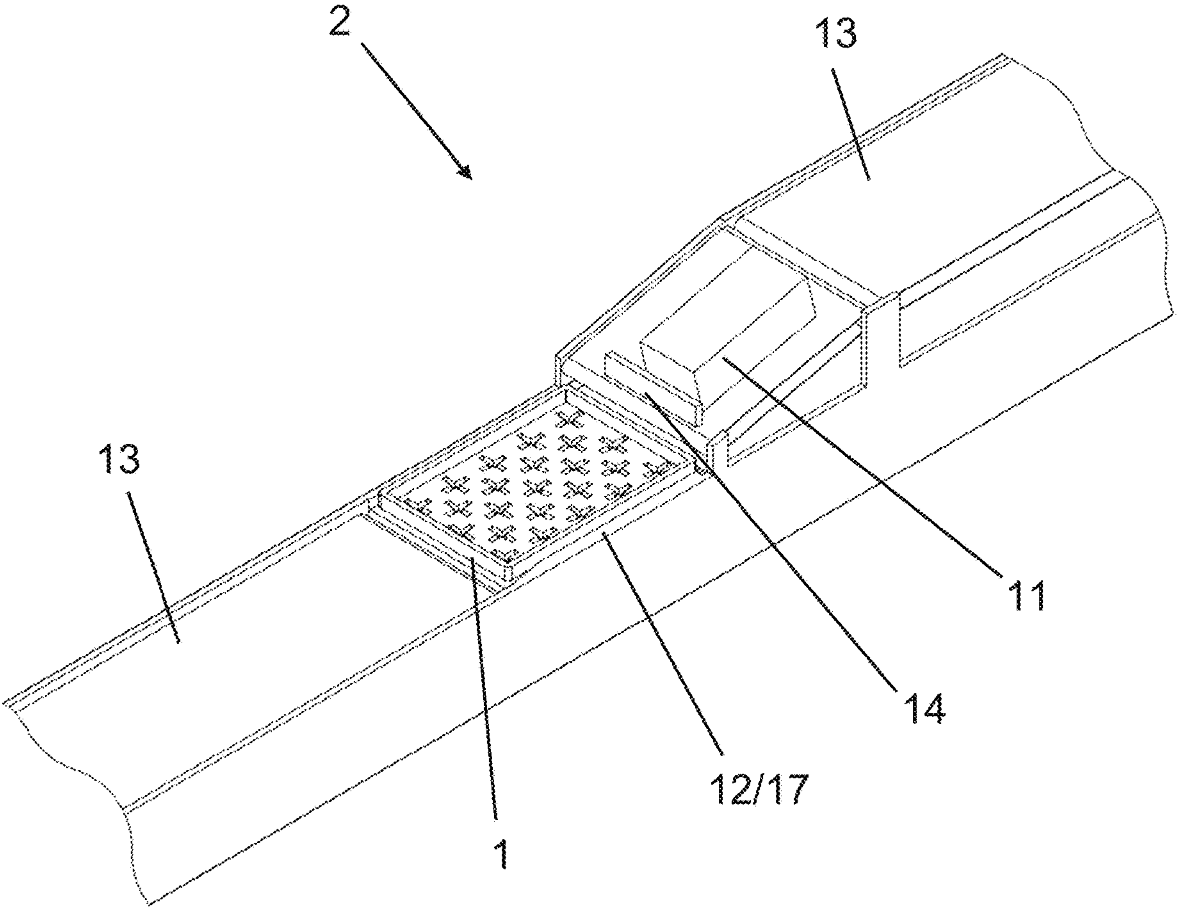

FIG. 6 shows a transport system 2 as described in FIG. 3, where the conveyor arm 14 has moved the goods in the direction of the conveyor belt 13 and the plastic tray 1 is empty. The lifting pins are retracted again. The goods 11 are transported away via the other conveyor belts 13, the latches 15 are lowered so that the plastic tray 1 can be transported to the rear by another conveyor arm (not shown).

Figure 7:
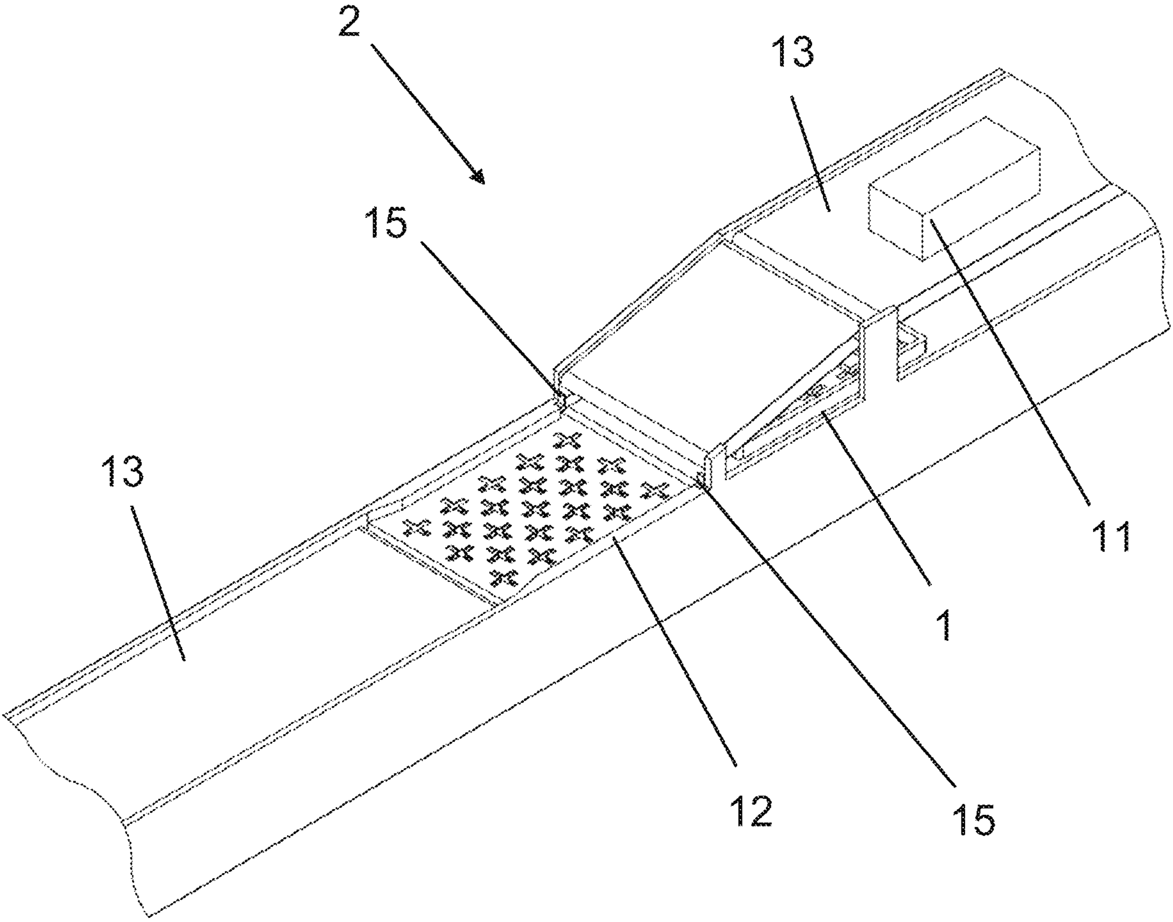

FIG. 7 shows a transport system 2 as described in FIG. 3, whereby the goods 11 and the plastic tray 1 are transported separately on different levels and latches 15 are folded up again for stopping and positioning the next plastic tray 1.

While a particular embodiment of the present transport system and use of a plastic tray for a transport system have been described herein, it will be appreciated by those skilled in the art that changes and modifications may be made thereto without departing from the invention in its broader aspects and as set forth in the following claims.

LIST OF REFERENCE SIGNS

- 1 Plastic tray
- 2 Conveyor system
- 3 Top side of the frame
- 4 Opening
- 5 Lifting pin
- 6 Bottom
- 7 Frame
- 8, 8' Row
- 9, 9', 9" Cross arms
- 10 Bottom side of the frame
- 11 Goods
- 12 Unloading station
- 13 Conveyor belt
- 14 Conveyor arm
- 15 Latch
- 16 Opening for lifting pins
- 17 Inlet slope

The invention claimed is:

1. A transport system for conveying a plastic tray for transporting and unloading goods, wherein the plastic tray has a bottom, a frame and openings with a cruciform cross-section in the bottom for the reach-through of lifting pins of the transport system, wherein the transport system has a conveyor belt and an unloading station with lifting pins, whereby the lifting pins have a cruciform cross-section, which is complementary to the cruciform openings of the plastic tray.

2. The transport system according to claim 1, wherein the openings with the cruciform cross-section are arranged in parallel rows and at equal distances over the entire bottom surface of the plastic tray.

3. The transport system according to claim 2, wherein the openings with the cruciform cross-section of a row are arranged offset relative to the cruciform openings of an adjacent row.

4. The transport system according to claim 2, wherein the cruciform openings of a row are offset relative to the cruciform openings of an adjacent row by less than one cross length and by at least the width of a cross arm.

5. The transport system according to claim 2, wherein the rows have two or three cruciform openings per row in the transverse direction.

6. The transport system according to claim 1, wherein the cross arms of the cruciform openings and the cruciform cross-section of the lifting pins have a 90-degree angle with respect to each other and each have the shape of a rectangular beam.

7. The transport system according to claim 6, wherein two cross arms of the cruciform openings and the cruciform cross-section of the lifting pins are of equal length, and wherein the cruciform openings and the cross-section of the lifting pins have the shape of a plus sign.

8. The transport system according to claim 6, wherein the cross arms of the cruciform openings and the cruciform cross-section of the lifting pins are arranged in the longitudinal direction and in the transverse direction of the tray.

9. The transport system according to claim 6, wherein the cross arms of the cruciform openings and the cruciform cross-section of the lifting pins are rotated 45 degrees with respect to the longitudinal direction of the plastic tray, and the openings have an x-shape.

10. The transport system according to claim 1, wherein a plurality of plastic trays are stackable on top of each other, such that an underside of the frame of an upper plastic tray rests in a stacked state on an upper side of the frame of a lower plastic tray.

11. The use of a plastic tray for a transport system according to claim 1, for transporting and unloading goods, wherein the plastic tray comprises a bottom, a frame and openings with a cruciform cross-section in the bottom for the reach-through of lifting pins of the transport system for unloading the goods from the plastic tray, wherein the openings of the plastic tray have a cruciform cross-section, and the lifting pins have a cruciform cross-section, which is complementary to the openings having a cruciform cross-section.

* * * * *